United States Patent [19]
Yuan

[11] Patent Number: 5,657,191
[45] Date of Patent: Aug. 12, 1997

[54] STABILIZATION OF GIANT MAGNETORESISTIVE TRANSDUCERS

[75] Inventor: Samuel W. Yuan, Sunnyvale, Calif.

[73] Assignee: Read-Rite Corporation, Milpitas, Calif.

[21] Appl. No.: 529,574

[22] Filed: Sep. 18, 1995

[51] Int. Cl.⁶ ............................................ G11B 5/39
[52] U.S. Cl. ............................................ 360/113
[58] Field of Search ........................ 360/113; 324/207.21

[56] References Cited

U.S. PATENT DOCUMENTS 5,406,433  4/1995  Smith ...................................... 360/113

FOREIGN PATENT DOCUMENTS 6-203333  7/1994  Japan ...................................... 360/113

Primary Examiner—Robert S. Tupper
Assistant Examiner—George J. Letscher
Attorney, Agent, or Firm—Nathan N. Kallman

[57] ABSTRACT

A magnetic transducer employing giant magnetoresistance (GMR) has alternating ferromagnetic layers and spacer layers, the spacer layers having either different material compositions or different thicknesses across their widths to produce variations in the coupling between adjacent ferromagnetic layers across their widths. Longitudinal stabilization of the multi-layer GMR sensor is achieved by the use of exchange coupling layers on the top and/or bottom of the sensor edge-track regions.

5 Claims, 4 Drawing Sheets

STABILIZATION OF GIANT MAGNETORESISTIVE TRANSDUCERS

FIELD OF THE INVENTION

This invention relates to magnetic transducers and in particular to such transducers employing exchange coupling and a giant magnetoresistive (GMR) effect.

DESCRIPTION OF THE PRIOR ART

It is known in the prior art that exchange coupling occur between ferromagnetic (FM) layers across spacer layers, as described in the publication entitled *Layered Magnetic Structures: Evidence for Antiferromagnetic Coupling of Fe Layers Across Cr Interlayers*, Physical Review Letters, Volume 57, Number 19, page 2442, P. Grunberg et al, 1986. The Grunberg et al. publication discloses the oscillatory interlayer coupling dependence on spacer layer thickness. Further, the publication entitled *Dependence on Fermi Surface Dimensions of Oscillatory Exchange Coupling in $Co/Cu_{1-x}Ni_x$ (110) Multilayers*, Volume 70, Number 11, page 1711, S. Okuno et al, 1993, discusses the relationship between the interlayer coupling and the spacer layer composition, with the oscillation period becoming longer with increasing Ni concentration in a Co/Cu Ni system. The publication entitled *Systematic Variation of the Strength and Oscillation Period of Indirect Magnetic Exchange Coupling Through the 3d, 4d, and 5d Transition Metals*, Physical Review Letters, Volume 67 Number 25, page 3598, S. Parkin, 1991, discusses exchange coupling variations for different 3d, 4d and 5d transition metals.

GMR multi-layers are often antiferromagnetic (AFM) coupled, so that conventional stabilization methods, such as patterned exchange or hard-magnet pinning, cannot be used. Stabilization for GMR multi-layers is needed to maintain a single domain state and to control the edge-track region to be nonresponsive to off-track signal distortion, since a GMR head is inherently more sensitive to such disturbances than an MR head.

A multilayer GMR head has a large $\Delta R/R$ effect when the interlayer coupling is large, where R is the resistance of the whole system when it is either magnetically saturated or when there is no magnetic field present, and $\Delta R$ is the difference between these values of R and its presently measured value. $H_{coupling}$ is the magnetic force in oersteds applied to the coupled layers. Both $\Delta R/R$ and $H_{coupling}$ oscillate with spacer thickness, with a decreasing amplitude envelope. To achieve a large sensitivity $\Delta R/R/H_{coupling}$, the spacer thickness where the 2nd peak of $\Delta R/R$ and $H_{coupling}$ occur is usually chosen for the actual device application, as is discussed below.

The interlayer exchange coupling increases monotonically with the number of valence electrons per atom in the spacer layer; therefore, $H_{coupling}$ also depends on the electron density and ultimately the material composition of the spacer layers. The spacer layer material selected for use in the present invention should be (1) conductive, (2) nonmagnetic and (3) have Fermi energy levels which permit free electrons to scatter and locate in the 3d, 4d or 5d orbits in the 3rd, 4th or 5th electron shells of the atom involved.

SUMMARY OF THE INVENTION

The above two effects regarding the modulation of the interlayer exchange coupling field owing to either spacer geometry variations or to spacer material property variations are used for longitudinal stabilization in the present invention. A first technique employs a spacer layer of uniform composition which is thinner in the side-track or edge-track regions than in the center-track region. The center-track region is that portion of the transducer which is defined by sense current flow and which actively detects stray flux from a recorded track on the medium, and the side-track or edge-track regions are those portions of the record medium to the sides of the center-track region.

The second approach utilizes a different spacer material composition in the edge-track regions than in the center-track region in order to obtain a large coupling field locally. With Co, Fe, NiFe, or noble metals such as Au, Ag or alloys thereof as the ferromagnetic (FM) layers, the spacer materials can be 3d, 4d, or 5d transition metals such as Nb, Mo, Ru, Rh, V, Cr, or Cu, or alloys thereof such as $Cu_{1-x}Ni_x$, where 3d, 4d and 5d represent electron orbits in the 3rd, 4th and 5th electron shells of the metals.

This invention provides structure to maintain the single domain state and to control off-track signal distortion for both current-in-the-plane (CIP) mode and current-perpendicular-to-the-plane (CPP) mode transducers.

Conventional patterned exchange pinning on the top and/or bottom FM layers is used to ensure edge domain stabilization. There are three possible approaches to this part of the present invention:

(1) Deposit an exchange film on only one side (e.g. the top) of the FM layer;
(2) Deposit the same exchange films (or similar) on the top and the bottom FM layers, with the same pinning direction if the number of FM layers is odd;
(3) Deposit two different exchange films on the top and the bottom FM layers, with opposite pinning directions if the number of FM layers is even.

The actual deposition procedures for these approaches involve either depositing the center-region spacer while masking the track-edge regions, and then using photo liftoff or etching to clear out the edge-track regions to produce a thinner spacer therein, or using different composite or individual sputtering targets to deposit different spacer composition materials.

In summary, the present invention involves
(1) Adjusting either the spacer layer thickness or the spacer layer material composition in the side-track regions to obtain large coupling between adjacent FM layers; and
(2) Using patterned exchange pinning on the top and bottom FM layers.

By combining (1) & (2), longitudinal domain stabilization for GMR multi-layer structures is produced.

DESCRIPTION OF THE PREFERRED EMBODIMENT

Figure 1:
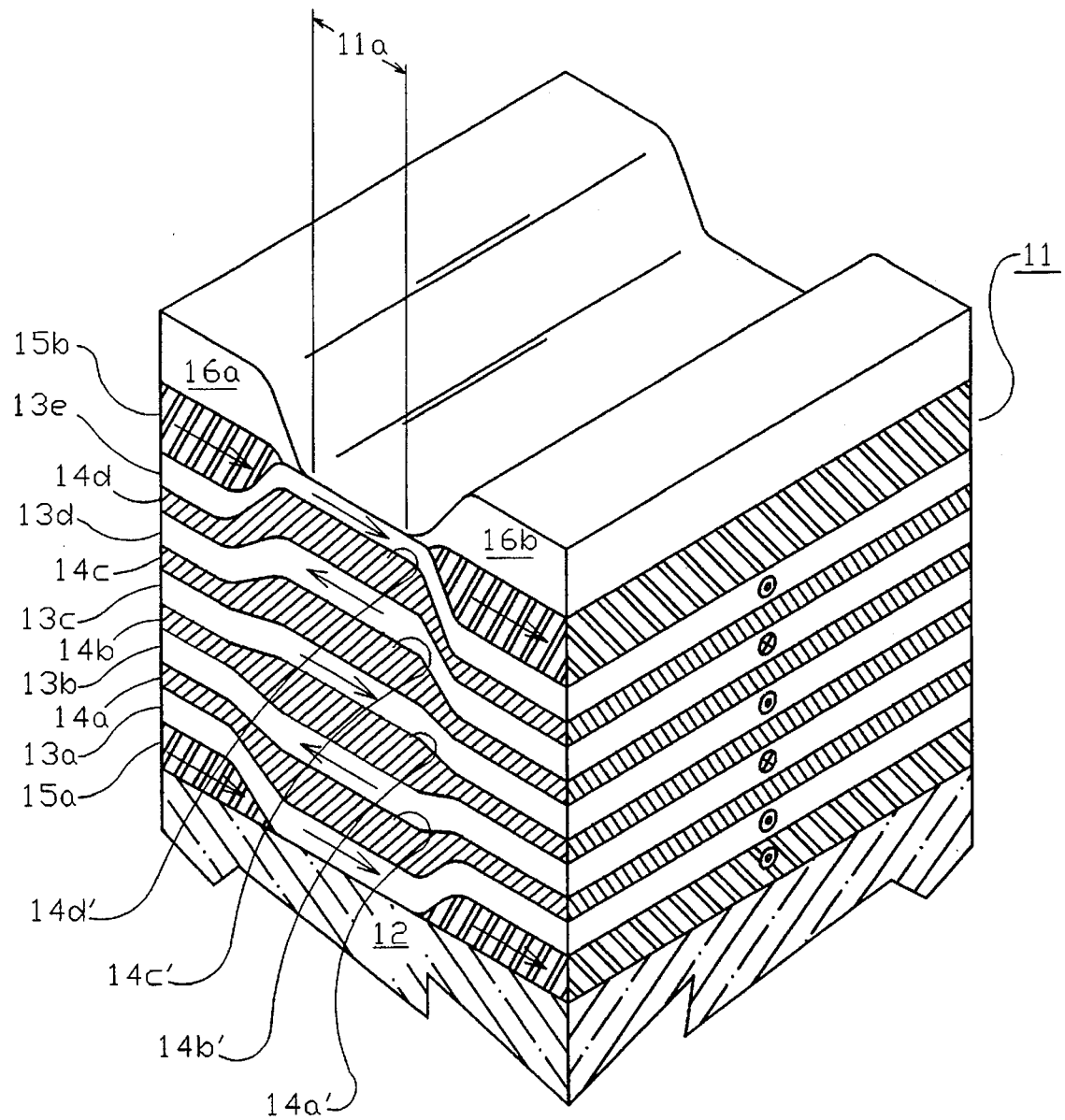
FIG. 1 is an isometric view partly in cross-section of one embodiment of the invention in which the spacer layers have varying thicknesses across their widths.

Referring to FIG. 1, reference numeral 11 designates generally one embodiment of a magnetic transducer which operates in a GMR mode to reproduce magnetic signals from a recording medium (not shown) to produce electrical signals representative of the magnetic signals. Transducer 11 includes a substrate 12 forming a base for the structure on which is deposited a first exchange coupling layer 15a. Exchange coupling layer 15a may comprise a suitable coupling material such as FeMn or NiMn. Disposed on exchange coupling layer 15a is a first FM layer 13a representing the first of a plurality of spaced FM layers 13a, 13b, 13c, 13d, 13e. Layers 13a–13e may be of any suitable ferromagnetic material such as Permalloy 9 (a nickel-iron alloy), or alloys of Co and Fe.

Interleaved between spaced FM layers 13a–13e are spacer layers 14a, 14b, 14c, 14d for providing coupling with the FM layers in the magnetic structure. In the embodiment of FIG. 1, layers 14a–14d have the same chemical composition but have different thicknesses across their width, as represented by thicker portions 14a', 14b', 14c', 14d' in the center-track region 11a. This structure leaves thinner portions of the spacer layers in the side-track or edge-track regions away from center-track region 11a.

A second exchange layer 15b is located on upper FM layer 13e, followed by conductive lead members 16a, 16b. Lead members supply sense current to the structure and provide a path for the voltage drop produced by magnetic signals detected by the transducer. The directions of the arrows in both FIG. 1 and FIG. 2 indicate the direction of quiescent magnetic flux flow in the FM layers without transverse biasing.

The structure of FIG. 1 may be provided with top and bottom shields (not shown in FIG. 1) of a suitable magnetic material such as NiFe. Each of the spacer layers and FM layers preferably have a thickness of 10–100 Å and a total height from top to bottom of 1000–3000 Å. Center track region 11a has a width of from 0.5 microns to 2 or 3 microns. The structure of FIG. 1 results in a CIP mode of operation for the transducer, with current flowing in the plane of the transducer.

Figure 2:
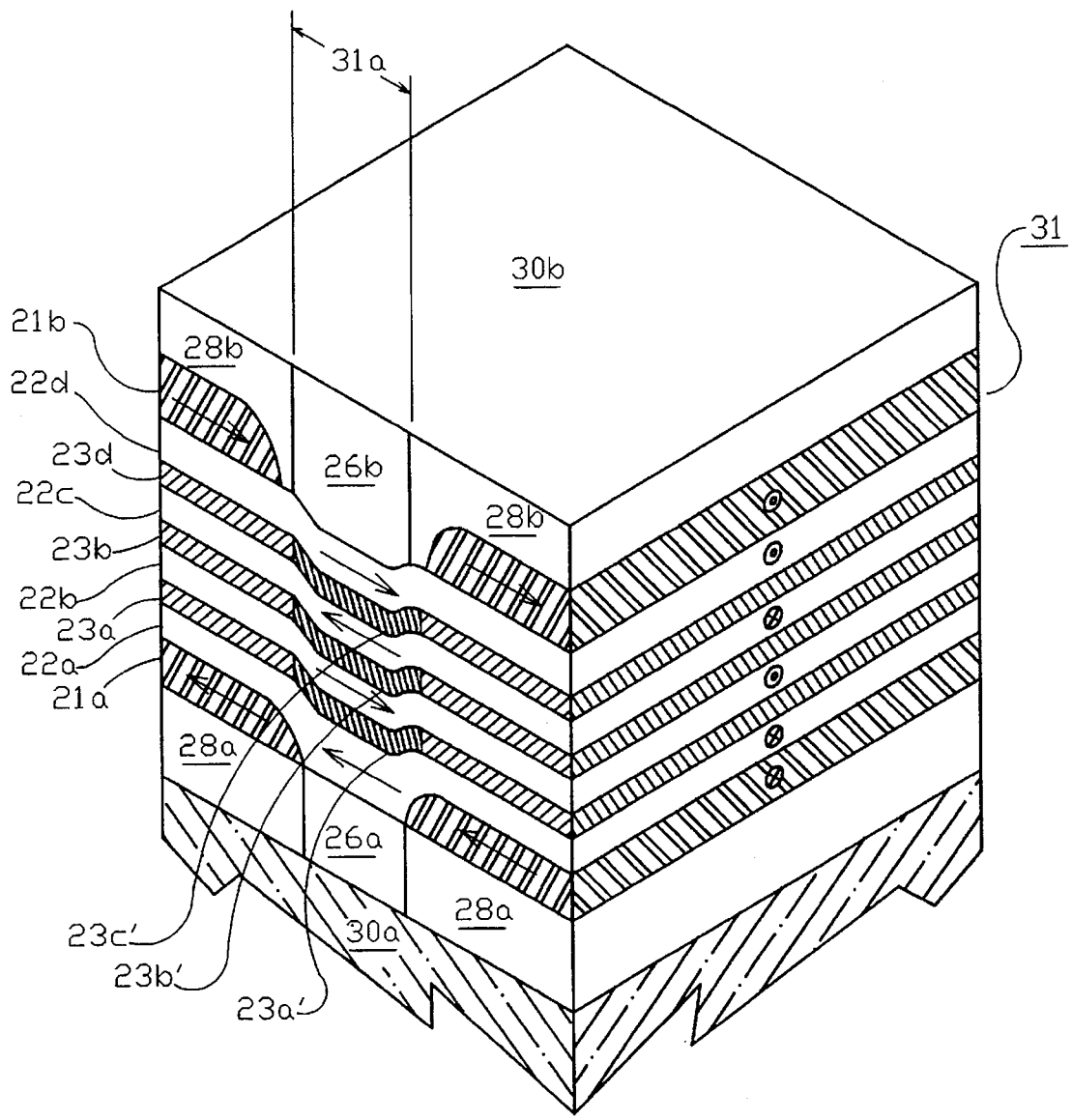
FIG. 2 is an isometric view partly in cross-section of another embodiment of the invention in which the spacer layers have varying chemical compositions across their widths.

FIG. 2 shows an alternate embodiment of a transducer 31 in accordance with the invention in which the chemical composition of the spacer layers varies across the width of the spacer layers. The structure includes a first exchange layer 21a in contact on one surface with a first ferromagnetic layer 22a only in the edge track regions. Lower gap members 28a are located on either side of conductive lead member 26a. Spaced FM layers 22a, 22b, 22c, 22d are interleaved with spacer layers 23a, 23b, 23c. A second exchange layer 21b is located on upper FM layer 22d, and a top conductive lead member 26b is in contact with FM layer 22d. Upper gap members 28b are located adjacent to upper lead member 26b. Gaps 28a, 28b may be of any suitable dielectric material such as $Al_2O_3$ or $SiO_2$. A shield member 30b is located at the top of the structure, and a bottom shield member 30a is located at the bottom of the structure. The structure of FIG. 2 results in a CPP mode of operation.

Spacer layers 23a–23c in FIG. 2 have a uniform thickness across their widths and have portions in their center track region 31a which have different chemical compositions than the portions in the edge-track regions. These portions of different chemical composition in the center-track region are represented by reference characters 23a', 23b', 23c'.

Example of materials suitable for the FM/spacer layers in the embodiment of FIG. 1, in which the spacer layers have different thickness across their widths, are Co/Cu, Fe/Cr or NiFe(Co)/Cu. Examples of materials for the spacer layers of FIG. 2, in which the spacer layers have different chemical composition in their side-track regions than in their center-track regions, are $Cu_{0.86}Ni_{0.14}$ for the side-track regions and $Cu_{0.65}Ni_{0.35}$ for the center-track region.

Figure 3A:
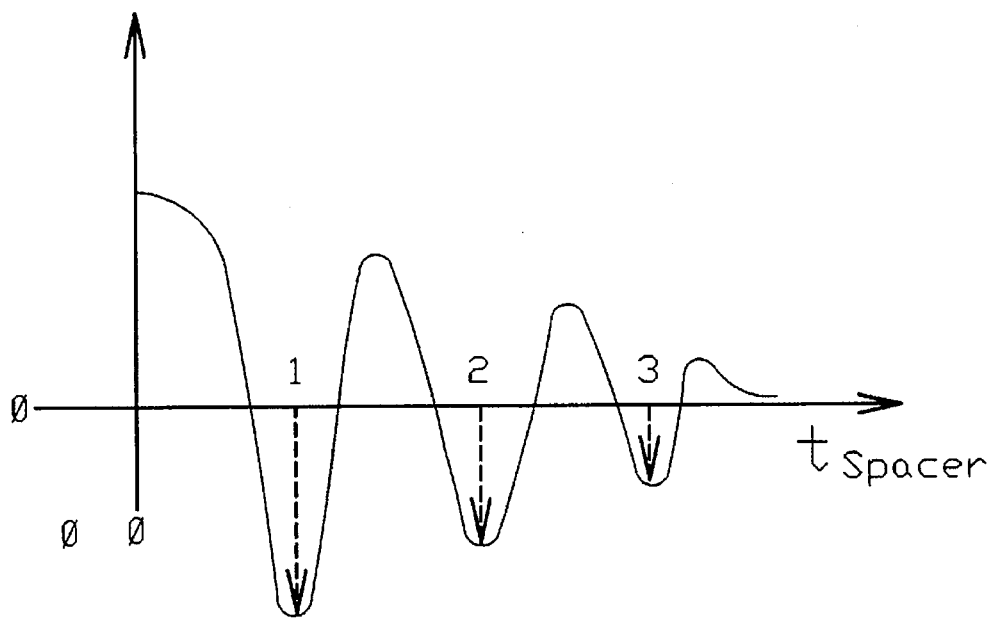
FIGS. 3A and 3B are graphs illustrating the variations in magnetic force $H_{coupling}$ and $\Delta R/R$ with the thickness of the spacer layer.
Figure 3B:
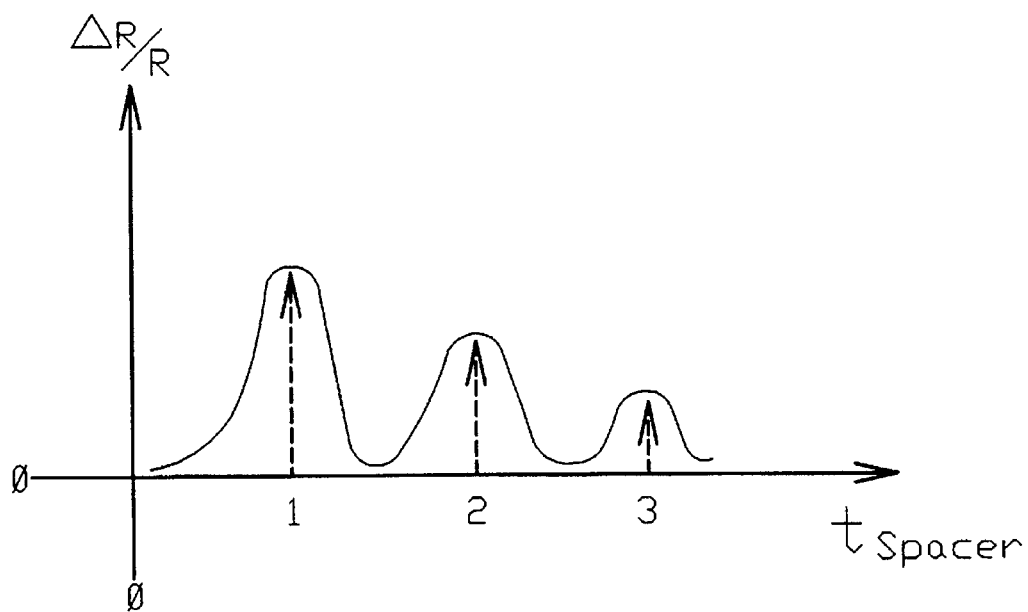

FIG. 3A shows the oscillatory variation in magnetic coupling H in oersteds as a function of the thickness t of the spacer layer. As seen, the value of H has a first negative-going peak labeled "1" at a given thickness of the spacer layer, followed by a second, lower magnitude negative-going peak labeled "2" at a larger thickness of the spacer layer. FIG. 3B shows the variations in the ratio ΔR/R, where R and ΔR are the resistance values described above, as a function of the thickness t of the spacer layer. The curve of FIG. 3B has a first positive-going peak labeled "1" at the first thickness t and a second positive-going peak labeled "2" at the larger thickness of the spacer layer. The scale for the spacer thickness in both FIGS. 3A and 3B is the same.

As stated above, to achieve a large sensitivity ΔR/R/$H_{coupling}$, the spacer thickness t corresponding to the second peak "2" in FIG. 3B is chosen for the center-track region. For the edge or side-track regions, the value of H corresponding to peak "1" in FIG. 3A is preferably chosen. Values for H at the second peak 2 of FIG. 3A in the center-track regions can be in the tens to hundreds of oersteds, while the value of H in the side-track regions corresponding to peak "1" can be in the thousands of oersteds.

Figure 4A:
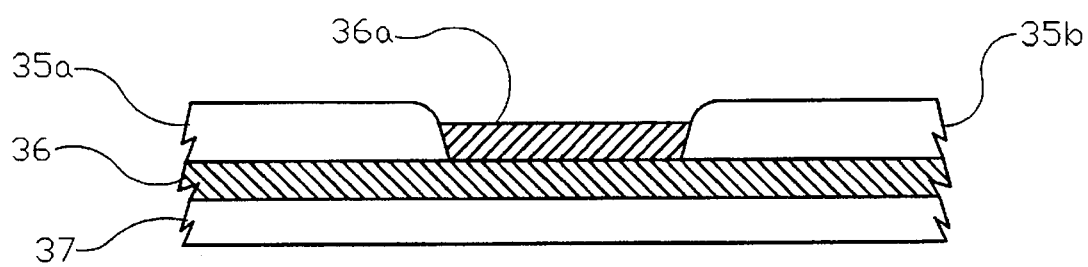
FIGS. 4A–4D illustrate steps in producing a structure in which the thickness of the spacer layers varies across the width.

FIGS. 4A–4D illustrate steps which can be used in fabricating structure in accordance with the present invention. In a first step, flat layers of FM material and spacer material are deposited, with the spacer layer thickness corresponding to the thickness t at the value of peak "1" in FIG. 3A. Then, as shown in FIG. 4A, masks 35a, 35b are deposited in the edge-track regions on a flat spacer layer 36 which has been deposited on a flat FM layer 37. An additional portion of spacer material 36a is then added to layer 36, without breaking the vacuum in the deposition apparatus. This ensures that a continuous interface is maintained between layer 36 and additional portion 36a.

Figure 4B:
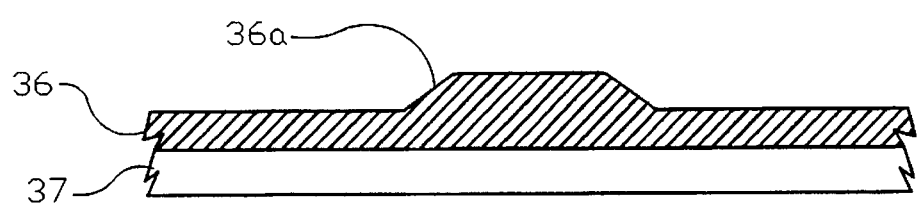
Figure 4C:
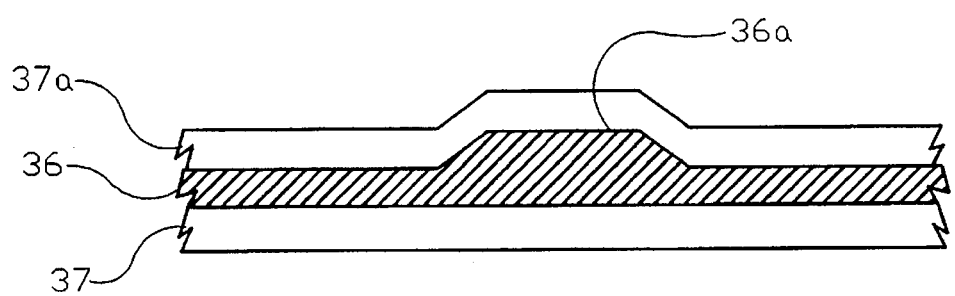
Figure 4D:
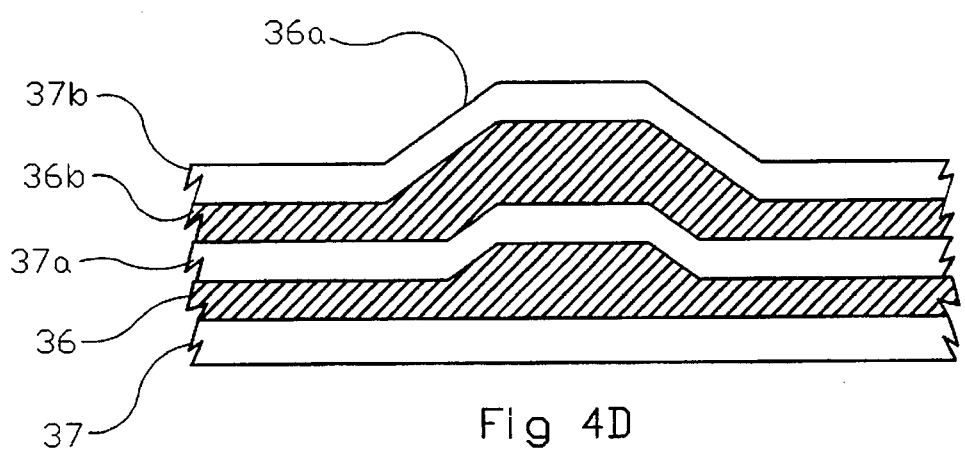

Masks 35a, 35b are then lifted off and sloping sides are etched in the sides of portion 36a, as shown in FIG. 4B. FIG. 4C shows the deposition of an additional layer 37a of FM material 37 on layer 36 at a uniform deposition rate to produce a structure with a stepped configuration in the center-track region. This process continues with the deposition of an additional spacer layer 36b followed by an FM layer 37b, as shown in FIG. 4D. The process continues with the deposition of alternate FM and spacer layers until the desired structure is achieved. This will produce a transducer with an increased thickness in the center-track region relative to the thickness in the side-track regions.

What is claimed is:

1. A magnetic transducer providing giant magnetoresistance comprising:

a plurality of spaced ferromagnetic layers;

a plurality of spacer layers disposed between said spaced ferromagnetic layers, and exchange coupling layers adjacent to the top and the bottom ones of said plurality of ferromagnetic layers to provide exchange coupling between said ferromagnetic layers;

at least one of said spacer layers having varying magnetic properties across its width for producing variations in the coupling field between adjacent ones of said ferromagnetic layers and said spacer layers across the width of said transducer, in which at least one of said spacer layers has a varying chemical composition across its width at its center track region relative to its side track region for providing a higher exchange coupling at said side track region relative to said center track region.

2. A magnetic transducer in accordance with claim 1 in which at least one of said spacer layers has a varying thickness across its width.

3. A magnetic transducer in accordance with claim 1 in which said spacer layers include a transition metal.

4. A transducer in accordance with claim 1 in which the transducer has a center-track region and side-track regions and the exchange coupling between each of said adjacent ones of said ferromagnetic layers is greater in said side-track regions than in said center-track region.

5. A transducer in accordance with claim 4 in which the coupling in said side-track regions is in the thousands of oersteds and the coupling in said center-track region is in the tens to hundreds of oersteds.

* * * * *